United States Patent
Nishimura et al.

(10) Patent No.: US 7,995,168 B2
(45) Date of Patent: Aug. 9, 2011

(54) TRANSFLECTIVE LIQUID CRYSTAL DISPLAY HAVING A RELATIONSHIP BETWEEN THE ELECTRODE SPACING AND CELL GAP IN THE REFLECTION AND TRANSMISSION REGIONS

(75) Inventors: Joji Nishimura, Matsumoto (JP); Masakatsu Higa, Chino (JP)

(73) Assignee: Sony Corporation, Tokyo (JP)

( * ) Notice: Subject to any disclaimer, the term of this patent is extended or adjusted under 35 U.S.C. 154(b) by 553 days.

(21) Appl. No.: 11/437,799

(22) Filed: May 22, 2006

(65) Prior Publication Data
US 2006/0267891 A1    Nov. 30, 2006

(30) Foreign Application Priority Data

May 25, 2005  (JP) ................ 2005-151890
Mar. 20, 2006 (JP) ................ 2006-076306

(51) Int. Cl.
*G02F 1/1335* (2006.01)
*G02F 1/1343* (2006.01)

(52) U.S. Cl. ................ 349/114; 349/141
(58) Field of Classification Search .......... 349/114, 349/141
See application file for complete search history.

(56) References Cited

U.S. PATENT DOCUMENTS

| | | | |
|---|---|---|---|
| 6,768,531 B2 | 7/2004 | Ochiai et al. | |
| 6,995,818 B2 | 2/2006 | Ochiai et al. | |
| 7,209,206 B2 | 4/2007 | Ochiai et al. | |
| 7,327,428 B2 | 2/2008 | Yamazaki et al. | |
| 2003/0218664 A1 | 11/2003 | Sakamoto et al. | |
| 2005/0001959 A1* | 1/2005 | Chang | 349/114 |
| 2005/0078243 A1* | 4/2005 | Higa | 349/114 |
| 2005/0083462 A1 | 4/2005 | Lin | |
| 2005/0264720 A1* | 12/2005 | Itou et al. | 349/99 |
| 2006/0092363 A1 | 5/2006 | Hasegawa et al. | |
| 2006/0170846 A1* | 8/2006 | Ozawa | 349/114 |
| 2006/0256268 A1* | 11/2006 | Jeong et al. | 349/141 |

FOREIGN PATENT DOCUMENTS

| | | |
|---|---|---|
| JP | A-11-14978 | 1/1999 |
| JP | A-11-231340 | 8/1999 |
| JP | A-2003-114445 | 4/2003 |
| JP | 2003207795 A * | 7/2003 |
| JP | A 2003-344837 | 12/2003 |
| JP | A-2005-107489 | 4/2005 |
| JP | A-2006-126602 | 5/2006 |

* cited by examiner

*Primary Examiner* — Jessica M Merlin
(74) *Attorney, Agent, or Firm* — K&L Gates LLP (57) ABSTRACT

A liquid crystal device includes first and second substrates which are arranged so as to face each other with a liquid crystal layer interposed therebetween, and first and second electrodes which are provided on the first substrate facing the liquid crystal layer. The liquid crystal layer is driven by electric fields generated between the first and second electrodes. A reflective display region for reflective display and a transmissive display region for transmissive display are provided in each of a plurality of subpixel regions. A liquid-crystal-layer-thickness-adjusting layer is provided in at least the reflective display region so as to vary the thickness of the liquid crystal layer in the subpixel region. A gap between the first and second electrodes in a main direction of an electric field in the transmissive display region is narrower than a gap between the first and second electrodes in a main direction of an electric field in the reflective display region.

3 Claims, 8 Drawing Sheets

TRANSFLECTIVE LIQUID CRYSTAL DISPLAY HAVING A RELATIONSHIP BETWEEN THE ELECTRODE SPACING AND CELL GAP IN THE REFLECTION AND TRANSMISSION REGIONS

BACKGROUND

1. Technical Field

The present invention relates to a liquid crystal device and an electronic apparatus.

2. Related Art

Examples of known liquid crystal devices include transverse electric field mode liquid crystal devices which can control the alignment of liquid crystal molecules by applying an electric field along the surface of a substrate to a liquid crystal layer. Further, IPS (In-Plane Switching) mode and FFS (Fringe-Field Switching) mode liquid crystal devices with different configurations of the electrodes which generate an electric field to be applied to liquid crystal are known. In recent years, in order to realize a wide viewing angle by means of a transverse electric field system, a transflective liquid crystal device to which the transverse electric field system is applied has been suggested (for example, see JP-A-2003-344837).

The liquid crystal device disclosed in JP-A-2003-344837 is a multi-gap-type liquid crystal device in which a liquid-crystal-layer thickness in a reflective display region and a liquid-crystal-layer thickness in a transmissive display region are made different from each other. In this case, the transverse electric field system is applied to only the transmissive display region or both the transmissive display region and the reflective display region. In a transflective liquid crystal device, the number of times display light passes through the liquid crystal layer differs in the transmissive display region and the reflective display region. Accordingly, it is necessary to adjust the retardation of the liquid crystal layer in both regions in order to obtain appropriate display. With the application of the multi-gap structure, it is possible to adjust the retardation of the liquid crystal layer. However, in the transverse electric field mode liquid crystal device, as the liquid-crystal-layer thickness changes, a threshold voltage (driving voltage) changes. Accordingly, it is difficult to obtain favorable display for both reflective display and transmissive display even when the multi-gap structure is applied.

SUMMARY

An advantage of some aspects of the invention is that it provides a liquid crystal device which can perform display with high image quality and wide viewing angle for reflective display and transmissive display and can be manufactured by a simple process, in particular a transflective liquid crystal device.

According to a first aspect of the invention, a liquid crystal device includes first and second substrates which are arranged so as to face each other with a liquid crystal layer interposed therebetween, and first and second electrodes which are provided on the first substrate facing the liquid crystal layer. The liquid crystal layer is driven by electric fields generated between the first and second electrodes. A reflective display region for reflective display and a transmissive display region for transmissive display are provided in each of a plurality of subpixel regions. A liquid-crystal-layer-thickness-adjusting layer is provided in at least the reflective display region so as to vary the thickness of the liquid crystal layer in the subpixel region. A gap between the first and second electrodes in a main direction of an electric field in the transmissive display region is narrower than a gap between the first and second electrodes in a main direction of an electric field in the reflective display region.

According to this configuration, making the inter-electrode gap in the reflective display region wider than the inter-electrode gap in the transmissive display region results in adjusting a threshold voltage in the reflective display region and a threshold voltage in the transmissive display region. Accordingly, a change in threshold voltage due to a multi-gap structure can be suppressed. Therefore, according to the first aspect of the invention, it is possible to implement a liquid crystal device which has uniform electro-optical characteristics for reflective display and transmissive display while having the multi-gap structure, and to obtain display with high image-quality and wide viewing angle for both reflective display and transmissive display. Further, according to the first aspect of the invention, the threshold voltage can be easily adjusted by adjusting the gap between the first and second electrodes, and thus a liquid crystal device can be manufactured by a simple process at low cost.

In the liquid crystal device according to the first aspect of the invention, each of the first and second electrodes may have one or more strip electrodes, and the one or more strip electrodes of the first electrode and the one or more strip electrodes of the second electrode may be alternately arranged substantially in parallel with each other in each of the transmissive display region and the reflective display region. According to this configuration, it is possible to implement an IPS-mode liquid crystal device which can perform favorable display for both reflective display and transmissive display.

According to a second aspect of the invention, a liquid crystal device includes first and second substrates which are arranged so as to face each other with a liquid crystal layer interposed therebetween, and first and second electrodes which are provided on the first substrate facing the liquid crystal layer. The liquid crystal layer is driven by electric fields generated between the first and second electrodes. A reflective display region for reflective display and a transmissive display region for transmissive display are provided in each of a plurality of subpixel regions. A liquid-crystal-layer-thickness-adjusting layer is provided in at least the reflective display region so as to vary the thickness of the liquid crystal layer in the subpixel region. The first and second electrodes are laminated with an insulating film interposed therebetween. The first electrode has a plurality of strip electrodes, and the second electrode is formed in a region including the plurality of strip electrodes of the first electrodes within the subpixel region. A gap between the strip electrodes in a main direction of an electric field in the transmissive display region is narrower than a gap between the strip electrodes in a main direction of an electric field in the reflective display region.

According to this configuration, it is possible to implement an FFS-mode liquid crystal device which can perform favorable display for both reflective display and transmissive display.

In the liquid crystal device according to the first aspect of the invention, of the strip electrodes, the one or more strip electrodes arranged in the transmissive display region may have a width larger than that of the one or more strip electrodes arranged in the reflective display region. With this configuration, the inter-electrode gap can be easily performed by adjusting the line widths of the strip electrodes. Therefore, the adjustment for optimization of optical conditions can be easily performed.

In the liquid crystal device according to the first aspect of the invention, it is preferable that a product $dt \times Gt$ of the gap $dt$ between the electrodes in the electric field direction in the transmissive display region and the thickness $Gt$ of the liquid crystal layer in the transmissive display region be substantially equal to a product $dr \times Gr$ of the gap $dr$ between the electrodes in the reflective display region and the thickness $Gr$ of the liquid crystal layer in the reflective display region. With this configuration, adjusting the thickness of the liquid crystal layer and the inter-electrode gap so as to satisfy the above-described relationship makes it possible to easily match electro-optical characteristics of reflective display and transmissive display with each other.

According to a third aspect of the invention, an electronic apparatus includes the liquid crystal device described above. According to this configuration, an electronic apparatus including a transflective display unit which can perform favorable display for both reflective display and transmissive display can be provided at low cost.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a liquid crystal device according to a first embodiment of the invention will be described with reference to the drawings. The liquid crystal device of this embodiment is a transverse electric field mode liquid crystal device which performs image display by applying an electric field (transverse electric field) along a surface of a substrate to a liquid crystal layer and performing alignment control, in particular, an IPS (In-Plane Switching) mode liquid crystal device.

The scale of each layer or member has been adjusted in order to have a recognizable size in the drawings related to the embodiments.

The liquid crystal device of this embodiment is a color liquid crystal device having color filters on the substrate, and one pixel includes three subpixels which output color light components of R (red), G (green), and B (blue), respectively. Therefore, a display region, which is a minimum unit of display, is referred to as 'subpixel region'. Further, a display region having a set of subpixels (R, G, and B) is referred to as 'pixel region'.

Figure 1:
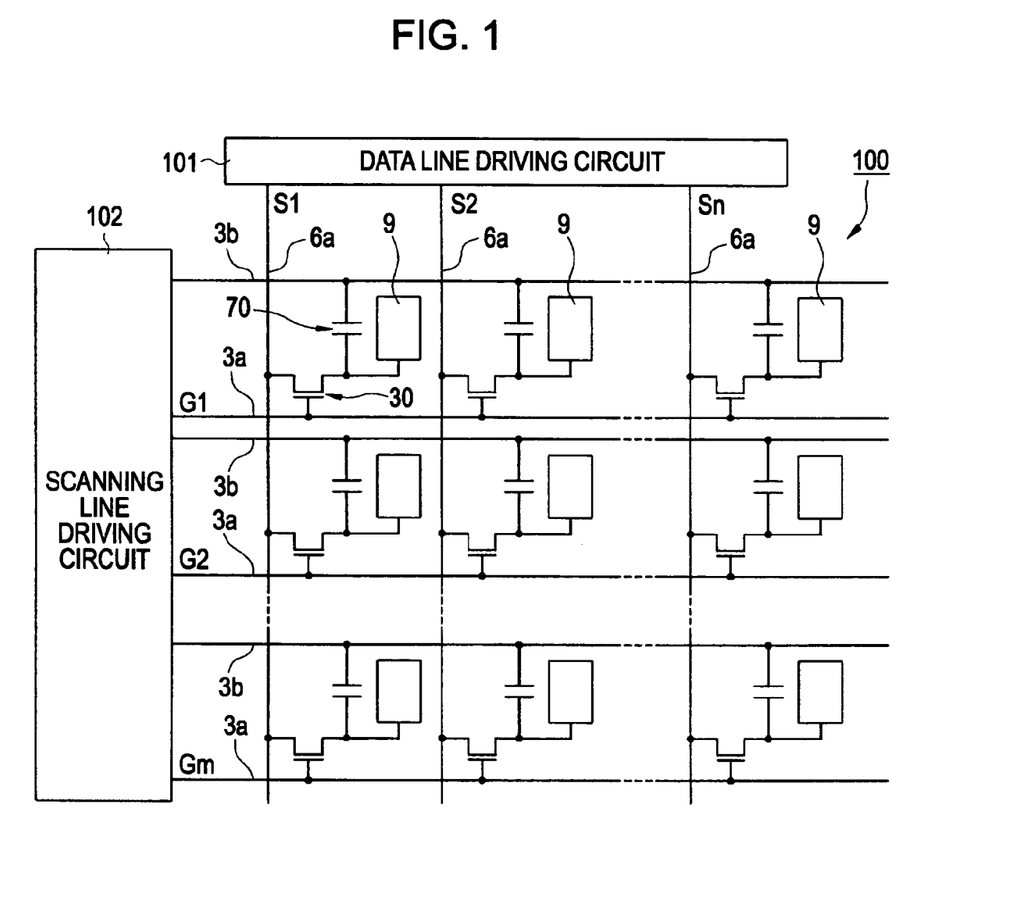
FIG. 1 is a structural circuit diagram of a liquid crystal device according to a first embodiment of the invention.
Figure 2A:
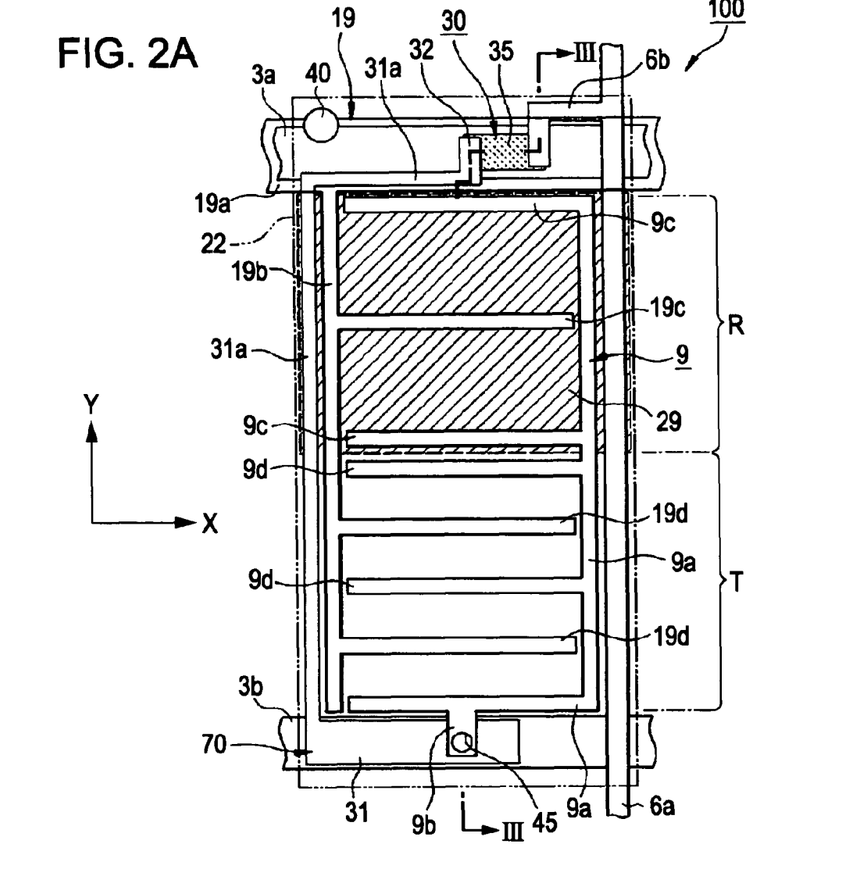
FIG. 2A is a structural plan view showing a subpixel region in the liquid crystal device according to the first embodiment of the invention.
Figure 2B:
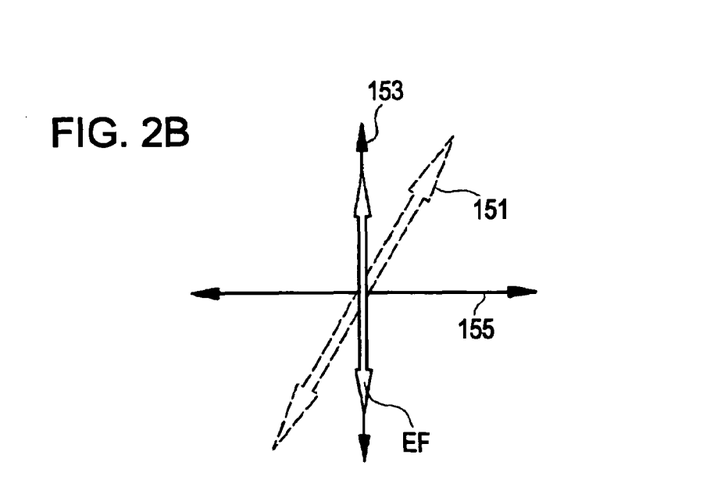
FIG. 2B is an explanatory view illustrating the arrangement relationship of optical elements constituting the liquid crystal device with respect to an optical axis.
Figure 3:
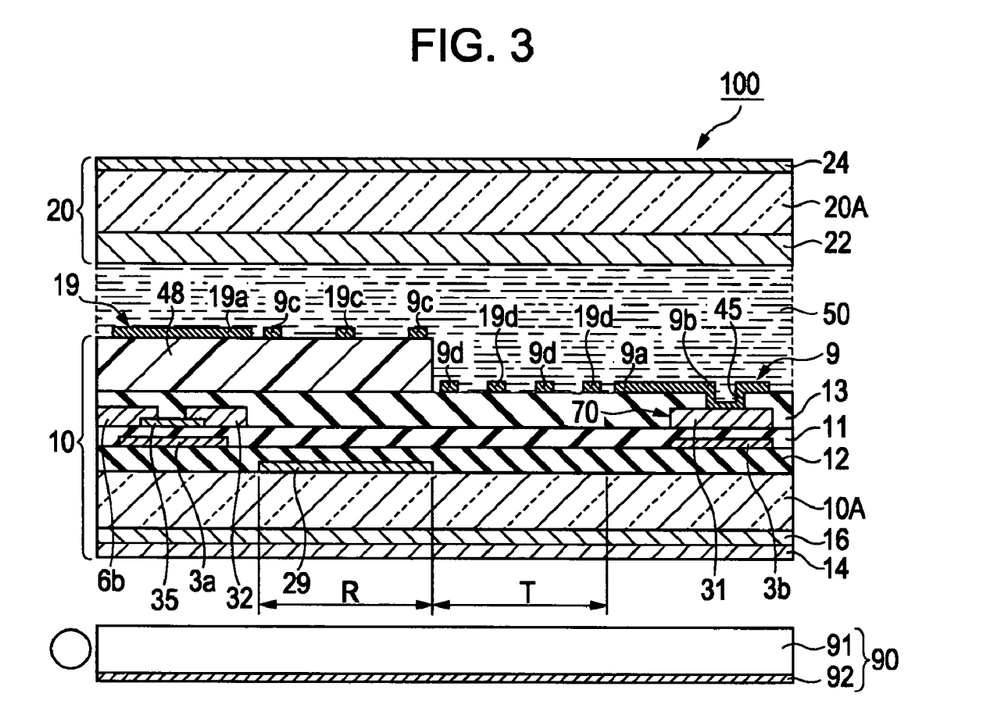
FIG. 3 is a structural cross-sectional view taken along the line III-III of FIG. 2A.

FIG. 1 is a structural circuit diagram of a plurality of subpixel regions formed in a matrix shape constituting the liquid crystal device of this embodiment. FIG. 2A is a structural plan view of a certain subpixel region of the liquid crystal device 100, and FIG. 2B is an explanatory view showing the arrangement relationship of optical elements constituting the liquid crystal device 100 with respect to an optical axis. FIG. 3 is a partial structural cross-sectional view taken along the line III-III of FIG. 2A.

As shown in FIG. 1, in each of a plurality of subpixel regions formed in a matrix shape constituting an image display region of the liquid crystal device 100, a pixel electrode 9 and a TFT 30 for switching control of the pixel electrode 9 are formed. A data line 6a extending from a data line driving circuit 101 is electrically connected to a source of the TFT 30. The data line driving circuit 101 correspondingly supplies image signals S1, S2, . . . , and Sn to the pixels through the data lines 6a. The image signals S1 to Sn may be linear-sequentially supplied in that order or may be individually supplied to a plurality of adjacent data lines 6a.

A scanning line 3a extending from a scanning line driving circuit 102 is electrically connected to a gate of the TFT 30. Scanning signals G1, G2, . . . , Gm, which are correspondingly supplied from the scanning line driving circuit 102 to the scanning lines 3a in a pulsed manner with a predetermined timing, are linear-sequentially applied to the gates of the TFTs 30 in that order. The pixel electrode 9 is electrically connected to a drain of the TFT 30. The TFTs 30 serving as switching elements are individually put in the ON state for predetermined periods by the input of the scanning signals G1, G2, . . . , and Gm, and then the image signals S1, S2, . . . , and Sn, which are supplied from the data lines 6a, are supplied to the pixel electrodes 9 with a predetermined timing.

The image signals S1, S2, . . . , and Sn having predetermined levels supplied to liquid crystal through the pixel electrodes 9 are held for a predetermined period between the pixel electrodes 9 and common electrodes with liquid crystal interposed therebetween. Here, in order to prevent leakage of the held image signals, a storage capacitor 70 is added in parallel with a liquid crystal capacitor which is formed between the pixel electrode 9 and the common electrode. The storage capacitor 70 is provided between the drain of the TFT 30 and a capacitor line 3b.

Next, the configuration of the liquid crystal device will be described in detail with reference to FIGS. 2A, 2B, and 3.

First, as shown in FIG. 3, the liquid crystal device 100 includes a TFT array substrate (first substrate) 10 and a counter substrate (second substrate) 20 with a liquid crystal layer 50 interposed therebetween. The liquid crystal layer 50 is sealed between the substrates 10 and 20 by a sealant (not shown) which is provided along an opposing edge of the TFT array substrate 10 or the counter substrate 20. In addition, the liquid crystal device has a so-called multi-gap structure in which the thickness of the liquid crystal layer 50 differs in a reflective display region R and a transmissive display region T. On the rear surface of the counter substrate 20 (the bottom surface in the drawing), a backlight (illumination device) 90 having a light-guiding plate 91 and a reflecting plate 92 is provided.

As shown in FIG. 2A, in the subpixel region of the liquid crystal device 100, the data line 6a extending in a Y-axis direction, and the scanning line 3a and the capacitor line 3b extending in an X-axis direction are substantially wired in a lattice shape in plan view. In a region which has a rectangular shape in plan view and is defined by the data line 6a, the scanning line 3a, and the capacitor line 3b, the pixel electrode (first electrode) 9 which has a comb shape in plan view and extends in the Y-axis direction, and a common electrode (second electrode) 19 which has a comb shape in plan view so as to mesh with the pixel electrode 9 and extends in the Y-axis direction are formed. At a corner on an upper left side of the subpixel region in the drawing, a columnar spacer 40 is provided upright so as to separate the TFT array substrate 10 from the counter substrate 20 by a predetermined gap, thereby maintaining the liquid-crystal-layer thickness (cell gap) uniformly.

In the subpixel region, a color filter 22 having the same planar shape as the subpixel region is provided. Further, a reflecting layer 29 is provided to occupy an upper half planar region of the extension region of the pixel electrode 9 and the common electrode 19 (Y-side region of regions bisected in the Y-axis direction). The reflecting layer 29 is formed by patterning a reflective metal film such as aluminum or silver. Of the planar region defined by the pixel electrode 9 and the common electrode 19, a planar region overlapping the reflecting layer 29 in plan view is the reflective display region R of the subpixel region, and the remaining region is the transmissive display region T. The reflecting layer 29 preferably has concave-convex shapes formed in its surface so as to enable optical scattering. With this configuration, visibility of reflective display can be improved.

The pixel electrode 9 has a substantially L-shaped base end portion 9a which extends along the data line 6a and the capacitor line 3b, two strip electrodes 9c which extend in the −X direction from the base end portion 9a, two strip electrodes 9d, and a contact portion 9b which extends from the base end portion 9a in the vicinity of the capacitor line 3b toward the −Y side. The pixel electrode 9 is an electrode member which is formed by patterning a transparent conductive material such as ITO (Indium-Tin-Oxide).

The common electrode 19 has a main line portion 19a which is formed at a position overlapping the scanning line 3a in plan view and extends in the X-axis direction, a base end portion 19b which extends in the Y-axis direction from the main line portion 19a along a side of the subpixel region, a strip electrode 19c which extends from the base end portion 19b toward a +X side, and two strip electrodes 19d.

The strip electrode 19c is disposed between the two strip electrodes 9c of the pixel electrode 9 and extends in parallel with the strip electrodes 9c. Meanwhile, the two strip electrodes 19d and the two strip electrodes 9d and a part of the base end portion 9a (a part extending in parallel with the capacitor line 3b) of the pixel electrode 9 are alternately disposed. The two strip electrodes 19d extend in parallel with the strip electrodes 9d. The common electrode 19 is also formed of a transparent conductive material such as ITO. The pixel electrode 9 and the common electrode 19 may be formed of a metal material such as chromium, in addition to the transparent conductive material.

Of the strip electrodes of the pixel electrode 9, a boundary region of the reflective display region R and the transmissive display region T (a side of the reflecting layer 29 close to the transmissive display region) is arranged between the strip electrodes 9c and 9d which are provided to be adjacent to each other in the central portion of the subpixel region.

Figure 5:
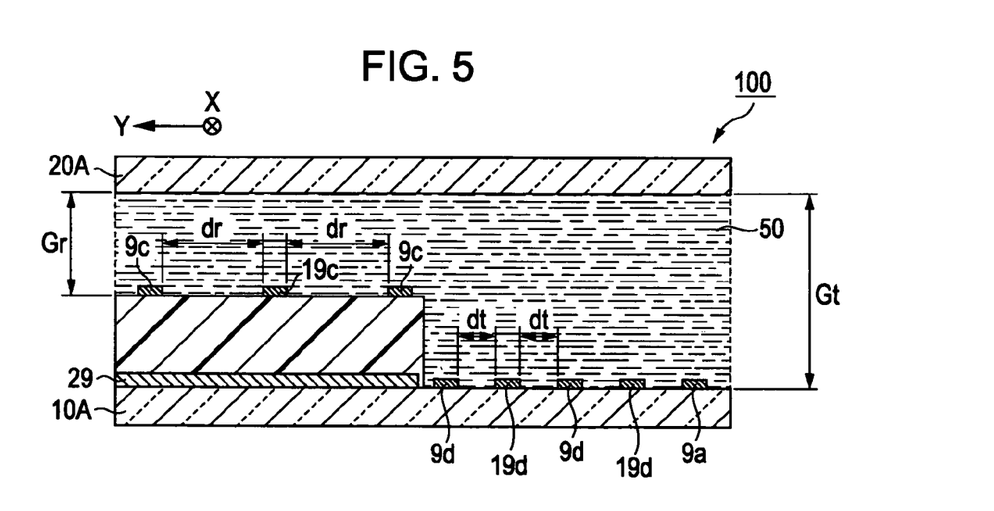
FIG. 5 is an explanatory view illustrating the effects of the liquid crystal device according to the first aspect of the invention.

In the subpixel region of the liquid crystal device according to this embodiment, a gap dr in the Y-axis direction between the strip electrodes 9c and 19c disposed in the reflective display region R (see FIG. 5) is made wider than a gap dt in the Y-axis direction between the strip electrodes 9d and 19d disposed in the transmissive display region T (see FIG. 5). More specifically, the gap dr is about twice as large as the gap dt. Then, upon operation of the liquid crystal device, a voltage is applied between the strip electrodes 9c and 9d of the pixel electrode 9 and the strip electrodes 19c and 19d of the common electrode 19, and an electric field (transverse electric field) in an XY plane direction (a direction parallel to the substrate) is applied to the liquid crystal of the subpixel region.

The TFT 30 is provided in the vicinity of an intersection between the data line 6a extending in the X-axis direction and the scanning line 3a extending in the Y-axis direction. The TFT 30 has a semiconductor layer 35 formed of an island-shaped amorphous silicon film which is partially formed in the planar region of the scanning line 3a, and source and drain electrodes 6b and 32 which are formed to partially overlap the semiconductor layer 35 in plan view. The scanning line 3a serves as a gate electrode of the TFT 30 at a position which partially overlaps the semiconductor layer 35 in plan view.

The source electrode 6b is a wiring line which has a reverse L shape in plan view and extends from the data line 6a to the semiconductor layer 35. The drain electrode 32 is electrically connected to a connection wiring line 31a which has a reverse L shape in plan view and extends along a side of the subpixel region at an end on the −Y side, and also electrically connected to a capacitor electrode 31 formed at an opposing edge of the subpixel region through the connection wiring line 31a.

The capacitor electrode 31 is a conductive member which is formed to overlap the capacitor line 3b in plan view and which has a rectangular shape in plan view. The contact portion 9b of the pixel electrode 9 is disposed to overlap the capacitor electrode 31. The capacitor electrode 31 and the pixel electrode 9 are electrically connected through a pixel contact hole 45 formed at that position. Further, in a region where the capacitor electrode 31 and the capacitor line 3b overlap in plan view, a storage capacitor 70 having the capacitor electrode 31 and the capacitor line 3b as the electrodes is formed.

Referring to the sectional structure shown in FIG. 3, the liquid crystal layer 50 is interposed between the TFT array substrate 10 and the counter substrate 20 which are arranged so as to face each other. On the outer surface of the TFT array substrate 10 (a side opposite to the liquid crystal layer 50), a retardation film 16 and a polarizing plate 14 are sequentially laminated. On the outer surface of the counter substrate 20, a polarizing plate 24 is provided. The retardation film 16 is a λ/2 retardation film which applies a half-wave phase difference to transmitted light. With the retardation film 16, display characteristics of reflective display and transmissive display can be arranged to be normally black. Therefore, contrast characteristics with a wide viewing angle can be obtained, without using a special device structure or signal processing configuration.

The TFT array substrate 10 has a light-transmissive substrate main body 10A such as glass, quartz, or plastic as a base. On the inner surface of the substrate main body 10A (facing the liquid crystal layer 50), the reflecting layer 29 formed of a metal film such as aluminum or silver is partially formed in the subpixel region. A first interlayer insulating film 12 formed of a transparent insulating material such as silicon oxide is formed to cover the reflecting layer 29. On the first interlayer insulating film 12, the scanning line 3a and the capacitor line 3b are formed. A gate insulating film 11 formed of a transparent insulating material such as silicon oxide is formed to cover the scanning line 3a and the capacitor line 3b.

On the gate insulating film 11, the semiconductor layer 35 formed of amorphous silicon is formed. The source electrode 6b and the drain electrode 32 are formed to partially run onto the semiconductor layer 35. In the same layer of the source electrode 6b and the drain electrode 32, the capacitor electrode 31 is formed at a position facing the capacitor line 3b. As shown in FIG. 2A, the drain electrode 32 is formed integrally with the connection wiring line 31a and the capacitor electrode 31. The semiconductor layer 35 faces the scanning line 3a through the gate insulating film 11. In the opposing region, the scanning line 3a functions as the gate electrode of the TFT 30. The capacitor electrode 31 and the capacitor line 3b facing the capacitor electrode 31 form the storage capacitor 70 with the gate insulating film 11 as a dielectric film.

A second interlayer insulating film 13 formed of silicon oxide or the like is formed to cover the semiconductor layer 35, the source electrode 6b, the drain electrode 32, and the capacitor electrode 31. On the second interlayer insulating film 13, a liquid-crystal-layer-thickness-adjusting layer 48 formed of a transparent insulating film such as acryl resin or the like is partially formed within the subpixel region. The pixel electrode 9 and the common electrode 19 formed of transparent conductive materials such as ITO or the like are formed over the surface of the liquid-crystal-layer-thickness-adjusting layer 48 and the surface of the second interlayer insulating film 13.

The liquid-crystal-layer-thickness-adjusting layer 48 makes the liquid-crystal-layer thickness in the reflective display region R and the liquid-crystal-layer thickness in the transmissive display region T different and optimizes the phase difference to be applied to light passing through the liquid crystal layer 50 in each of the reflective display region and the transmissive display region. The liquid-crystal-layer-thickness-adjusting layer 48 is formed in at least a region including the planar region of the reflecting layer 29. In this embodiment, the liquid-crystal-layer thickness in each region is adjusted such that the phase difference of the liquid crystal layer 50 in the reflective display region R is $\lambda/4$ and the phase difference of the liquid crystal layer 50 in the transmissive display region T is $\lambda/2$. The liquid-crystal-layer thickness in the reflective display region is made to be about half of the liquid-crystal-layer thickness in the transmissive display region T.

Of the strip electrodes 9c and 9d constituting the pixel electrode 9, the strip electrodes 9c disposed in the reflective display region R are arranged on the liquid-crystal-layer-thickness-adjusting layer, and the strip electrodes 9d disposed in the transmissive display region T are arranged on the second interlayer insulating film 13 in a region outside the liquid-crystal-layer-thickness-adjusting layer 48. Further, the strip electrode 19c of the common electrode 19 is arranged on the liquid-crystal-layer-thickness-adjusting layer 48, and the strip electrodes 19d are arranged on the second interlayer insulating film 13.

The pixel contact hole 45 is formed so as to pass through the second interlayer insulating film 13 and reach the capacitor electrode 31, and the contact portion 9b of the pixel electrode 9 is partially buried in the pixel contact hole 45.

Then, the pixel electrode 9 and the capacitor electrode 31 are electrically connected. In the transmissive display region T and the reflective display region R, the strip electrodes 9c and 9d and the strip electrodes 19c and 19d are alternately arranged. Further, the main line portion 19a of the common electrode 19 is formed at a position facing the semiconductor layer 35, the source electrode 6b, and the drain electrode 32 through the second interlayer insulating film 13. Though not shown, an alignment film formed of polyimide or the like is formed to cover the pixel electrode 9 and the common electrode 19.

Meanwhile, on the inner surface of the counter substrate 20 (facing the liquid crystal layer 50), the color filter 22 is provided. On the color filter 22, an alignment film (not shown) formed of polyimide or the like is laminated. The color filter 22 is preferably divided into two regions having different degrees of color within the subpixel region. As a specific example, a first color material region can be provided to correspond to the planar region of the transmissive display region T, and a second color material region can be provided to correspond to the planar region of the reflective display region R. Further, the degree of color of the first color material region can be larger than the degree of color of the second color material region. With this configuration, a difference in degree of color between the transmissive display region T where display light passes through the color filter 22 only once and the reflective display region R where display light passes through the color filter 22 twice can be prevented. Therefore, display quality can be improved by arranging the appearance of reflective display and transmissive display.

On the color filter 22, a planarizing film formed of a transparent resin material is preferably laminated. With the planarizing film, the surface of the counter substrate 20 is planarized, which makes it possible to uniformize the thickness of the liquid crystal layer 50. Therefore, contrast can be prevented from being degraded due to nonuniformity of a driving voltage in the subpixel region.

The arrangement of each optical axis in the liquid crystal device of this embodiment is as shown in FIG. 2B. A transmission axis 153 of the polarizing plate 14 on the TFT array substrate 10 is arranged in parallel in the Y-axis direction, and a transmission axis 155 of the polarizing plate 24 on the counter substrate 20 is arranged in a direction perpendicular to the transmission axis 153 of the polarizing plate 14 (the X-axis direction). Further, the alignment films of the TFT array substrate 10 and the counter substrate 20 are subjected to a rubbing treatment in the same direction. This direction is a rubbing direction 151 shown in FIG. 2B. In this embodiment, the rubbing direction 151 has an angle of about 60° with respect to the X-axis direction. As the rubbing direction 151, a certain direction may be selected, and a direction intersecting the main direction of the transverse electric field generated between the pixel electrode 9 and the common electrode 19, that is, a direction not matching with the main direction of the transverse electric field, is preferably selected. In this embodiment, upon application of the voltage, the direction EF of the transverse electric field generated in the subpixel region is parallel to the Y-axis direction and has an angle of 30° with respect to the rubbing direction 151.

The relationship between the rubbing direction 151 and the transverse electric field direction EF can be suitably changed according to the retardation value of the liquid crystal layer 50 or the optical arrangement of the polarizing plates 14 and 24, and is not limited to one shown in FIG. 2B.

The liquid crystal device 100 having the above-described configuration is an IPS-mode liquid crystal device. In this case, the application of the image signal (voltage) to the pixel electrode 9 through the TFT 30 causes the electric field along the surface of the substrate to be generated between the pixel electrode 9 and the common electrode 19 (the Y-axis direction of FIG. 2 in plan view). Then, the liquid crystal is driven by the electric field, and transmittance/reflectance of each subpixel is changed, thereby image display is performed.

Figure 4:
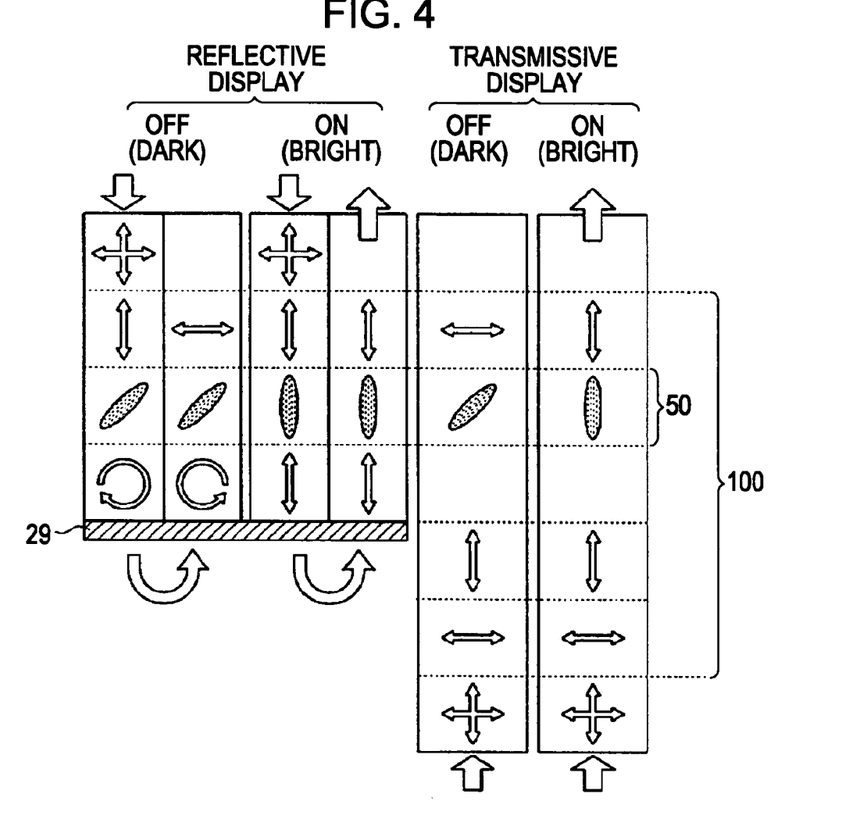
FIG. 4 is an explanatory view illustrating the operation of the liquid crystal device according to the first embodiment of the invention.

Here, the display operation of the liquid crystal device 100 having the above-described configuration will be specifically described with reference to FIG. 4. FIG. 4 is an explanatory view illustrating the operation of the liquid crystal device 100. In FIG. 4, an explanatory view illustrating the operation of reflective display (left side) and an explanatory view illustrating the operation of transmissive display (right side) are shown. Referring to the explanatory view illustrating the operation of reflective display, external light incident from above in the drawing travels toward the lower side of the drawing and reaches the reflecting layer 29. Then, light reflected by the reflecting layer 29 returns toward the upper side of the drawing and serves as display light. Referring to the explanatory view illustrating the operation of transmissive display, illumination light incident from below in the drawing travels toward the upper side of the drawing and serves as display light.

An arrow in each frame of FIG. 4 represents the polarization state of light incident on the liquid crystal device 100 and light passing through the liquid crystal device 100 in plan view. As regards the illustration of the arrow, a horizontal direction in FIG. 4 corresponds to the X-axis direction of FIG. 2A and a vertical direction corresponds to the Y-axis direction of FIG. 2A.

First, transmissive display (transmission mode) on the right side of FIG. 4 will be described.

In the liquid crystal device 100, light emitted from the backlight 90 passes through the polarizing plate 14, and is converted into linearly polarized light parallel to the transmission axis 153 of the polarizing plate 14 to be then incident on the retardation film 16. The retardation film 16 is the $\lambda/2$ retardation film which applies the half-wave phase difference to transmitted light. Accordingly, linearly polarized light having passed through the polarizing plate 14 is converted into linearly polarized light perpendicular to the polarizing plate 14 and is emitted from the retardation film 16 to be then incident on the liquid crystal layer 50.

Then, if the liquid crystal layer 50 is in an OFF state (non-selection state), linearly polarized light is given a predetermined phase difference ($\lambda/2$) by the liquid crystal layer 50 and is converted into linearly polarized light having a polarization direction rotated by 90° from that when incident. When linearly polarized light reaches the polarizing plate 24, it is absorbed by the polarizing plate 24 which has the transmission axis 155 perpendicular to the polarization direction, and the subpixel performs dark display.

Meanwhile, if the liquid crystal layer 50 is in an ON state (selection state), incident light is emitted from the liquid crystal layer 50 and reaches the polarizing plate 24 while having the same polarization state as when incident. Then, light passes through the polarizing plate 24 having the transmission axis 155 parallel to linearly polarized light to be viewed, and the subpixel performs bright display.

Next, reflective display on the left side of FIG. 4 will be described.

In reflective display, light incident from the upper side (outside) of the polarizing plate 24 passes through the polarizing plate 24 and is converted into linearly polarized light parallel to the transmission axis 155 of the polarizing plate 14 to be then incident on the liquid crystal layer 50. At this time, if the liquid crystal layer 50 is in the OFF state, linearly polarized light has a predetermined phase different ($\lambda/4$) by the liquid crystal layer 50 and is converted into clockwise circularly polarized light. In this embodiment, the phase difference of the liquid crystal layer 50 in the reflective display region R is set to be half of the phase difference in the transmissive display region T due to the multi-gap structure. Accordingly, as described above, linearly polarized light passes through the liquid crystal layer 50 to be then converted into circularly polarized light.

Clockwise circularly polarized light emitted from the liquid crystal layer 50 is reflected by the reflecting layer 29. At that time, the rotation direction of clockwise circularly polarized light viewed from the polarizing plate 24 is inverted, and clockwise circularly polarized light becomes counterclockwise circularly polarized light to be then incident on the liquid crystal layer 50 again. Next, counterclockwise circularly polarized light is given a predetermined phase difference ($\lambda/4$) by the liquid crystal layer 50 and is converted into linearly polarized light to then return to the polarizing plate 24. Linearly polarized light reaching the polarizing plate 24 is linearly polarized light having a direction perpendicular to the transmission axis 155 of the polarizing plate 24. Accordingly, linearly polarized light is absorbed by the polarizing plate 24, and the subpixel performs dark display.

Meanwhile, if the liquid crystal layer 50 is in the ON state, linearly polarized light incident on the liquid crystal layer 50 is emitted from the liquid crystal layer 50 and reaches the reflecting layer 29 while having the same polarization state as when incident. Then, linearly polarized light reflected by the reflecting layer 29 passes through the liquid crystal layer 50 and reaches the polarizing plate 24. Next, linearly polarized light passes through the polarizing plate 24 having the transmission axis 155 parallel to the polarization direction to be viewed, and the subpixel performs bright display.

As such, in the liquid crystal device 100 of this embodiment, with the multi-gap structure, the phase difference of the liquid crystal layer 50 in the reflective display region R is made to be about half of the phase difference of the liquid crystal layer 50 in the transmissive display region T. Accordingly, a difference in phase difference to be applied to display light does not occur for reflective display which uses light passing through the liquid crystal layer 50 twice as display light and transmissive display which uses light passing through the liquid crystal layer 50 only once as display light.

However, as described above, in the transverse electric field mode liquid crystal device, the driving voltage (threshold voltage) significantly changes according to the liquid-crystal-layer thickness. Accordingly, if the liquid-crystal-layer thickness differs in the subpixel region as a result of using the multi-gap structure, display quality is degraded due to a difference in threshold voltage between the reflective display region and the transmissive display region. In contrast, in this embodiment, the pixel electrode 9 and the common electrode 19 having the configuration shown in FIGS. 2A and 3 are used, and thus the degradation of display quality due to the change in threshold voltage is effectively prevented. Hereinafter, such a configuration will be described in detail with reference to FIG. 5.

FIG. 5 is a partial structural cross-sectional view of the subpixel region for explaining the effects of the liquid crystal device 100 according to this embodiment. FIG. 5 corresponds to and simplifies FIG. 3. As shown in FIG. 5, the liquid-crystal-layer-thickness-adjusting layer 48 partially formed in the subpixel region makes a thickness Gr of the liquid crystal layer 50 in the reflective display region R and a thickness Gt of the liquid crystal layer 50 in the transmissive display region T different from each other. In this embodiment, the liquidcrystal-layer thickness Gr is made to be about half of the liquid-crystal-layer thickness Gt. Further, an inter-electrode gap dr of the strip electrode 9c (pixel electrode) and the strip electrode 19c (common electrode) 19c in the reflective display region R is made wider than an inter-electrode gap dt of the strip electrode 9d (pixel electrode) and the strip electrode 19d (common electrode) in the transmissive display region T. In this embodiment, the inter-electrode gap dr is about twice as wide as the inter-electrode gap dt.

The inter-electrode gaps dr and dt are adjusted according to the relationship between the thicknesses Gr and Gt of the liquid crystal layer which are made different by the liquid-crystal-layer-thickness-adjusting layer 48. Specifically, the inter-electrode gaps and the thicknesses of the liquid crystal layer are adjusted such that the inter-electrode gaps dr and dt and the thicknesses Gr and Gt of the liquid crystal layer satisfy the relationship dr×Gr≡dt×Gt.

In this embodiment, the liquid-crystal-layer thickness Gr in the reflective display region R is made to be about half of the liquid-crystal-layer thickness Gt in the transmissive display region by the liquid-crystal-layer-thickness-adjusting layer 48. Accordingly, from the above-described relationship, the inter-electrode gap dr in the reflective display region R is about twice as large as the inter-electrode gap dt in the transmissive display region T. With this configuration, a decrease in threshold voltage caused by the reduction in the liquid-crystal-layer thickness Gr can be favorably compensated by an increase in threshold voltage following the increase of the inter-electrode gap dr. Further, a difference between the threshold voltage in the reflective display region R and the threshold voltage in the transmissive display region T can be prevented. In addition, the orientations of liquid crystal molecules can be arranged in the reflective display region R and the transmissive display region T.

As such, in the liquid crystal device 100 of this embodiment, as shown in FIG. 4, the inter-electrode gap dr in the reflective display region R and the inter-electrode gap dt in the transmissive display region T are made different, and thus the difference in threshold voltage due to the use of the multi-gap structure can be eliminated. Therefore, in the liquid crystal device of this embodiment, electro-optical characteristics of the reflective display region R and electro-optical characteristics of the transmissive display region T are made uniform by the adjustment of the phase difference of the liquid crystal layer 50 by use of the multi-gap structure and the adjustment of the threshold voltage by the adjustment of the inter-electrode gap. As a result, it is possible to obtain a liquid crystal device which enables favorable display for reflective display and transmissive display.

Second Embodiment

Next, a second embodiment of the invention will be described with reference to FIGS. 6 to 8.

Figure 6:
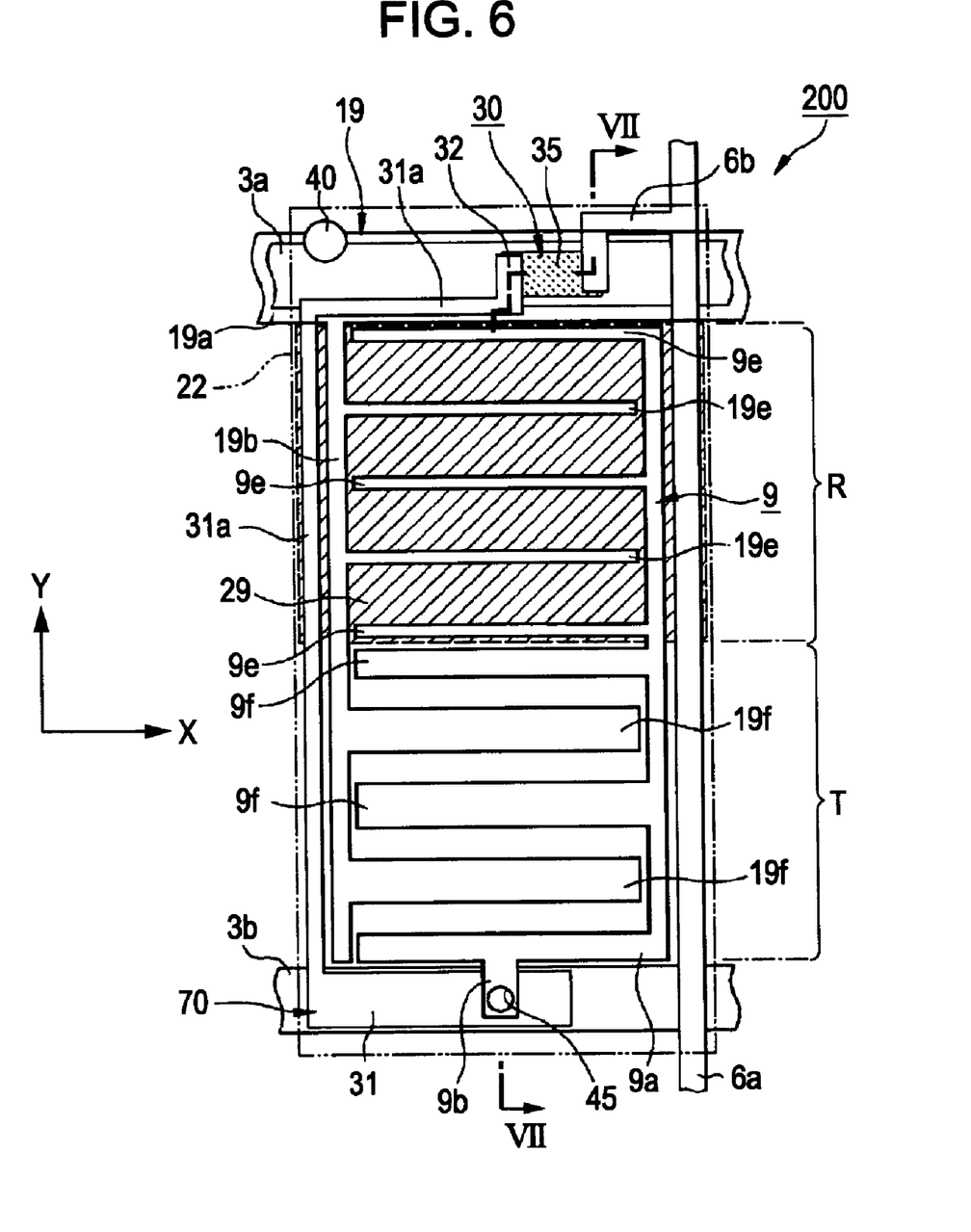
FIG. 6 is a structural plan view showing a subpixel region according to a second embodiment of the invention.

FIG. 6 is a structural plan view showing a certain subpixel region of a liquid crystal device 200 according to this embodiment. FIG. 7 is a partial structural cross-sectional view taken along the line VII-VII of FIG. 6. FIG. 8 is a schematic view showing a part of FIG. 7 for explaining the effects of the liquid crystal device 200.

The basic configuration of the liquid crystal device 200 according to this embodiment is the same as that of the first embodiment. FIG. 6 corresponds to FIG. 2B in the first embodiment, and FIGS. 7 and 8 correspond to FIGS. 3 and 5 in the first embodiment. Therefore, in FIGS. 6 to 8, the same parts as those of the liquid crystal device 100 in the first embodiment shown in FIGS. 1 to 5 are represented by the same reference numerals and the descriptions thereof will be omitted.

As shown in FIG. 6, the subpixel region of the liquid crystal device 200 according to this embodiment is divided into the reflective display region R and the transmissive display region T. In the reflective display region R, the reflecting layer 29, which is partially formed in the subpixel region, is provided. The pixel electrode (first electrode) 9 and the common electrode (second electrode) 19 are provided over the reflective display region R and the transmissive display region T.

The pixel electrode 9 is an electrode member which has a comb shape in plan view and is provided in the subpixel region. The pixel electrode 9 has a base end portion 9a which substantially has an L shape in plan view, three strip electrodes 9e and two strip electrodes 9f which extend from an extending portion of the base end portion 9a in the Y-axis direction toward the −X side, and a contact portion 9b which extends from an extending portion of the base end portion 9a in the X-axis direction toward the −Y side.

The common electrode 19 is an electrode member which substantially has a comb shape in the subpixel region in plan view and is provided over a plurality of subpixel regions. The common electrode 19 has a main line portion 19a which overlaps the scanning line 3a in plan view and extends in parallel with the scanning line 3a, a base end portion 19b which extends from the main line portion 19a toward the −Y side, and two strip electrodes 19e and two strip electrodes 19f which extend from the base end portion 19b toward the +X side.

Of the plurality of strip electrodes 9e, 9f, 19e, and 19f, the strip electrodes 9e and 19e extend in parallel with each other in the planar region of the reflecting layer 29 (in the reflective display region R), and are alternately arranged in the Y-axis direction. The remaining strip electrodes 9f and 19f extends in parallel with each other in the transmissive display region T and are alternately arranged in the Y-axis direction. Therefore, when a voltage is applied to the pixel electrode 9, an electric field in the Y-axis direction (transverse electric field) is generated between the strip electrodes 9e and 9f in the reflective display region R. Further, in the transmissive display region T, an electric field in the Y-axis direction is generated between the strip electrodes 9f and 19f.

In the liquid crystal device 200 according to this embodiment, the line widths in the Y-axis direction of the strip electrodes 9e and 19e arranged in the reflective display region R are formed narrower than the line widths in the Y-axis direction of the strip electrodes 9f and 19f arranged in the transmissive display region T. Therefore, in the liquid crystal device 200, like the liquid crystal device 100 described above, the inter-electrode gap dr in the Y-axis direction between the strip electrode 9e (pixel electrode) and the strip electrode 19e (common electrode) in the reflective display region R (see FIG. 8) is also made wider than the inter-electrode gap dt between the strip electrode 9f (pixel electrode) and the strip electrode 19f (common electrode) in the transmissive display region T (see FIG. 8). In this embodiment, the inter-electrode gap dr is about twice as large as the inter-electrode gap dt.

Figure 7:
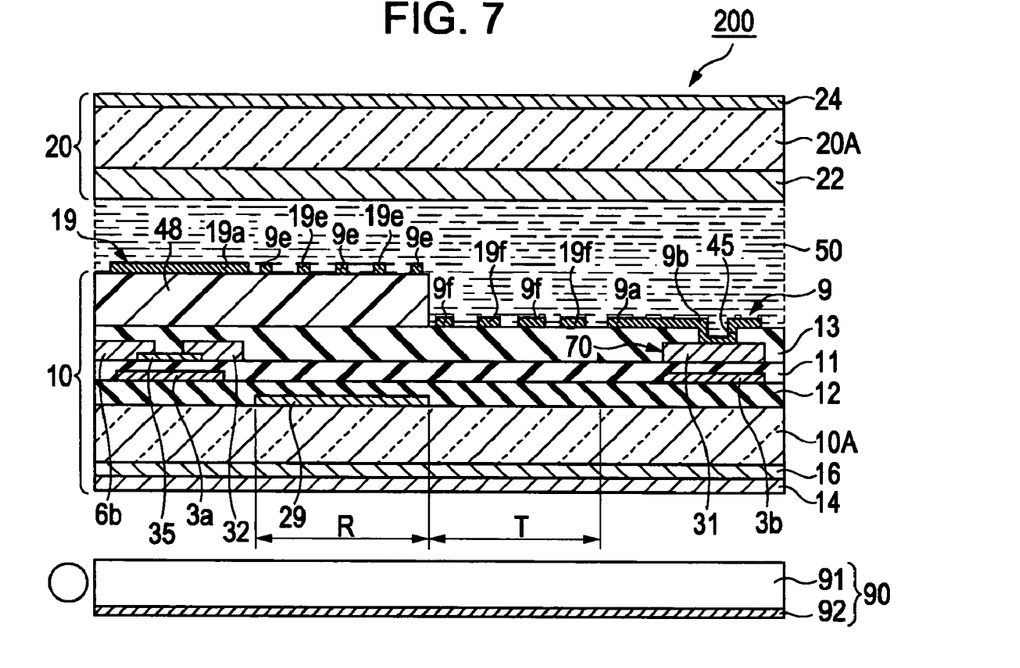
FIG. 7 is a structural cross-sectional view taken along the line VII-VII of FIG. 6.

Referring to the sectional structure shown in FIG. 7, the TFT array substrate 10 and the counter substrate 20 are arranged so as to face each other with the liquid crystal layer 50 interposed therebetween. On the outer surface of a substrate main body 10A which is the base of the TFT array substrate 10, a retardation film 16 and a polarizing plate 14 are provided. On the outer surface of a substrate main body 20A which is the base of the counter substrate 20, a polarizing plate 24 is provided. On the outer surface of the TFT array substrate 10, a backlight 90 is provided.

On the inner surface of the substrate main body 10A, the reflecting layer 29, the TFT 30, the storage capacitor 70, and so on are formed. On a second interlayer insulating film 13 which covers the reflecting layer 29, the TFT 30, the storage capacitor 70, and so on, a liquid-crystal-layer-thickness-adjusting layer 48 is partially formed. The pixel electrode 9 and the common electrode 19 are patterned over the surface of the liquid-crystal-layer-thickness-adjusting layer 48 and the surface of the second interlayer insulating film 13. The pixel electrode 9 and a capacitor electrode 31 are electrically connected through a contact hole 45 formed in the second interlayer insulating film 13.

Figure 8:
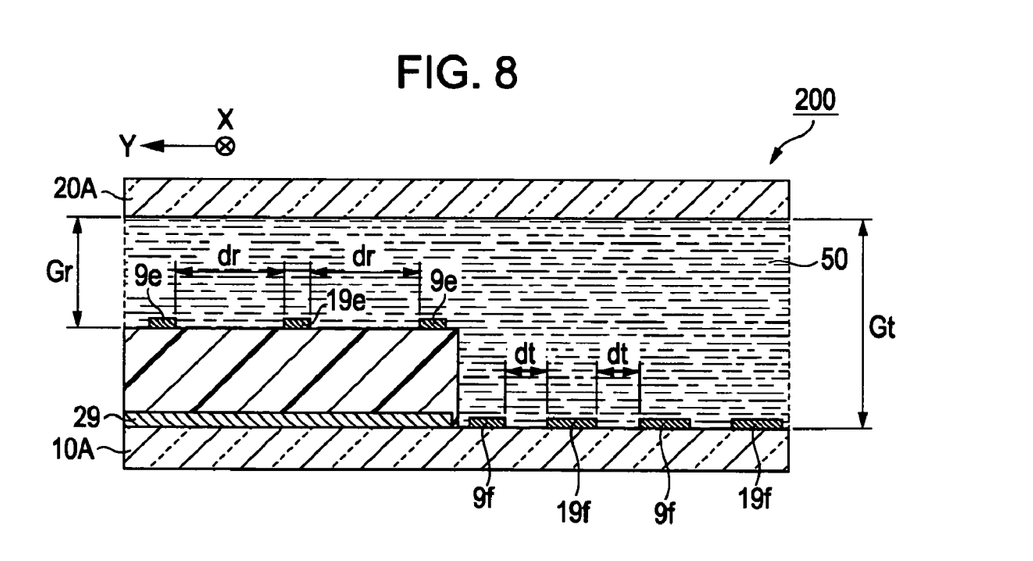
FIG. 8 is an explanatory view illustrating the effects of a liquid crystal device according to the second embodiment of the invention.

As shown in FIG. 8, in the liquid crystal device 200, with the liquid-crystal-layer-thickness-adjusting layer 48, the liquid-crystal-layer thickness in the reflective display region R and the liquid-crystal-layer thickness in the transmissive display region T differs from each other. In this embodiment, the liquid-crystal-layer thickness Gr in the reflective display region R (see FIG. 8) is made to be about half of the liquid-crystal-layer thickness Gt in the transmissive display region T (see FIG. 8). Meanwhile, the inter-electrode gap dt in the reflective display region R where the liquid-crystal-layer thickness Gr is small is about twice as large as the inter-electrode gap dt in the transmissive display region T where the liquid-crystal-layer thickness Gt is large. In this embodiment, the thicknesses of the liquid crystal layer and the inter-electrode gaps are preferably adjusted such that the thicknesses of the liquid crystal layer Gr and Gt and the inter-electrode gaps dr and dt satisfy the relationship Gr×dr≅Gt×dt.

The optical axis arrangement of the liquid crystal device 200 according to this embodiment is the same as the optical axis arrangement of the first embodiment shown in FIG. 2B. The transmission axes 153 and 155 of the polarizing plates 14 and 24 are arranged in parallel with the X-axis and Y-axis directions, respectively. The rubbing directions of the alignment films of the TFT array substrate 10 and the counter substrate 20 have an angle of about 60° with respect to the X-axis direction. Therefore, the initial alignment direction of the liquid crystal layer 50 and the direction of the transverse electric field generated when the voltage is applied to the pixel electrode 9 (the Y-axis direction) intersects each other at an angle of about 30°.

The operation of the liquid crystal device 200 according to this embodiment having the above-described configuration is the same as that of the liquid crystal device 100 of the first embodiment, and the description thereof will be omitted. In the liquid crystal device 200, with the multi-gap structure, the phase difference of the liquid crystal layer 50 in the reflective display region R is made to be about half of the phase difference of the liquid crystal layer 50 in the transmissive display region T. Accordingly, a difference in phase difference to be applied to display light does not occur for reflective display which uses light passing through the liquid crystal layer 50 twice as display light and transmissive display which uses light passing through the liquid crystal layer 50 only once as display light. Further, the change in threshold voltage due to the use of the multi-gap structure is suppressed by making the inter-electrode gap dr in the reflective display region R about twice as large as the inter-electrode dt in the transmissive display region T. As a result, reflective display and transmissive display having uniform electro-optical characteristics can be obtained.

Therefore, according to the liquid crystal device 200 of this embodiment, favorable display can be obtained for reflective display and transmissive display. Further, these effects can be easily implemented only by changing the planar shapes of the pixel electrode 9 and the common electrode 19. In particular, since the change in threshold voltage due to the difference in liquid-crystal-layer thickness can be adjusted by the line widths of the strip electrodes, display optimization can be performed by a simple process, and setting of design conditions can be easily performed.

In the liquid crystal device 200 according to this embodiment, as the line widths of the strip electrodes 9f and 19f arranged in the transmissive display region T are made relatively larger, the aperture ratio of the subpixel region is reduced. However, since the pixel electrode 9 and the common electrode 19 are formed of transparent conductive materials such as ITO and so on, the reduction of the aperture ratio can be prevented. Therefore, there is no occurrence of the significant reduction of brightness, as compared with the related art transverse electric field mode liquid crystal device.

In the transverse electric field mode liquid crystal device, responsibility of liquid crystal molecules may be reduced just above the strip electrodes generating the electric field for driving liquid crystal. Accordingly, it is undesirable to set the inter-electrode gap dt of the transmissive display region T such that the line widths of the strip electrodes 9f and 19f are made excessively large. Therefore, when the line widths of the strip electrodes 9f and 19f are made large to some extent, the inter-electrode gap dt needs to be narrow. In this case, the number of strip electrode 9f or 19f may be increased so as to make the inter-electrode gap dt narrow.

Third Embodiment

Next, a third embodiment of the invention will be described with reference to FIGS. 9 and 10.

Figure 9:
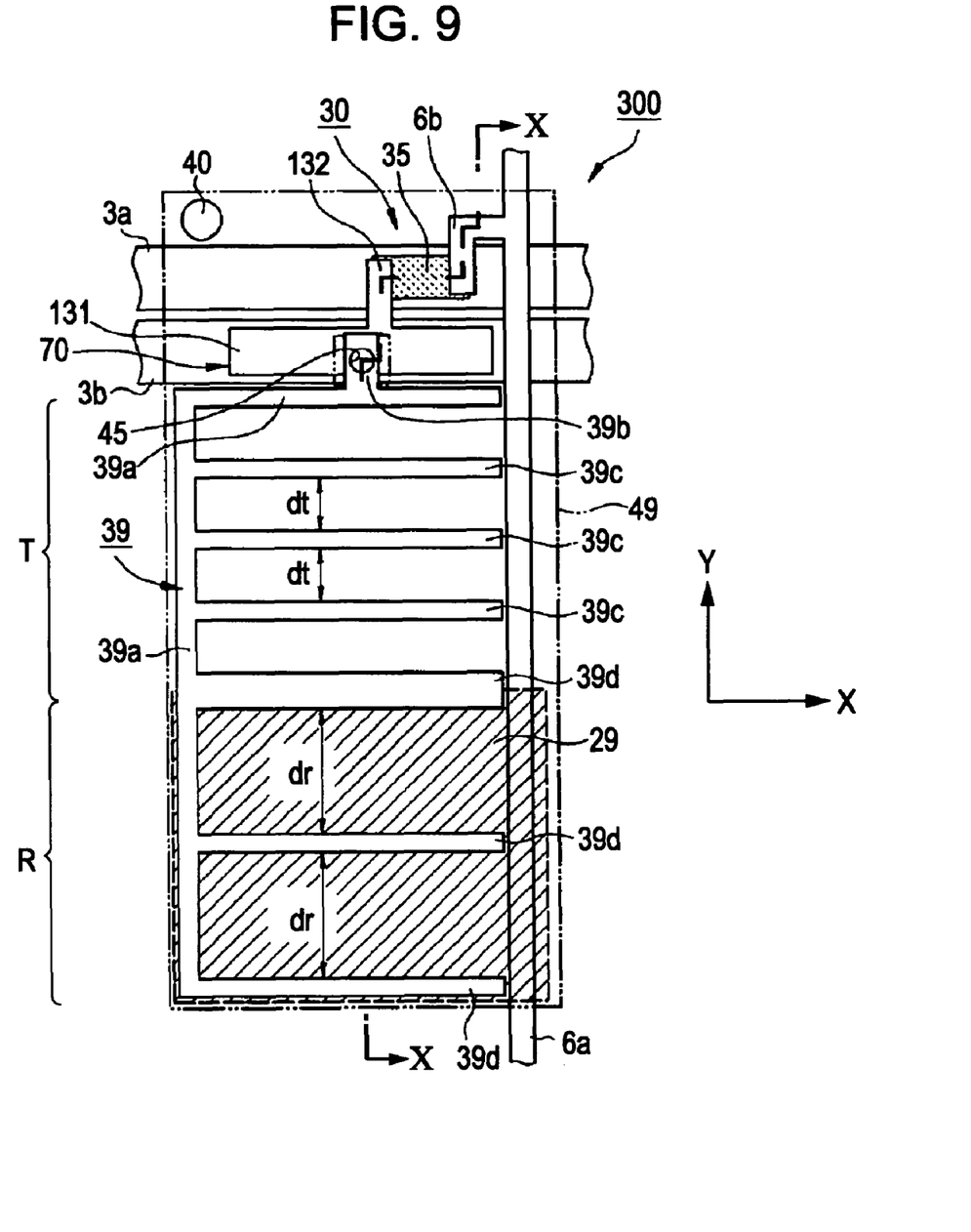
FIG. 9 is a structural plan view showing a subpixel region according to a third embodiment of the invention.

FIG. 9 is a structural plan view showing a certain subpixel region of a liquid crystal device 300 according to this embodiment. FIG. 10 is a structural cross-sectional view taken along the line X-X of FIG. 9.

The liquid crystal device 300 of this embodiment is a transverse electric field mode liquid crystal device which performs image display by applying an electric field along the surface of the substrate (transverse electric field) to liquid crystal and performing the alignment control, in particular, an FFS (Fringe Field Switching) mode liquid crystal device. The circuit configuration and the overall configuration of the liquid crystal device 300 of this embodiment is the same as those of the liquid crystal device 100 of the first embodiment. In FIGS. 9 and 10, the same parts as those of the liquid crystal device 100 of the first embodiment shown in FIGS. 1 to 5 are represented by the same reference numerals, and the descriptions thereof will be omitted.

As shown in FIG. 9, in the subpixel region of the liquid crystal device 300, a pixel electrode (first electrode) 39 which substantially has a comb shape in plan view and extends in the Y-axis direction, and a flat, substantially uniform common electrode (second electrode) 49 is arranged in a region including the pixel electrode 39 so as to overlap the pixel electrode 39 in plan view are provided. Therefore, the common electrode (second electrode) 49 is formed in a region which includes strip electrodes 39c and 39d of the pixel electrode (first electrode) 39. Further, the subpixel region shown in FIG. 9 is divided into a reflective display region R and a transmissive display region T. In the reflective display region R, a reflecting layer 29, which is partially formed in the subpixel region, is provided. The pixel electrode 39 is formed over the transmissive display region T and the reflective display region R.

A data line 6a which extends in the X-axis direction, a scanning line 3a which extends in the Y-axis direction, and a capacitor line 3b which extends in parallel with the scanning line 3a close to the scanning line 3a are formed. At a corner on an upper left side of the subpixel region in FIG. 9, a columnar spacer 40 is provided upright so as to maintain a TFT array substrate 10 and a counter substrate 20 to be separated by a predetermined gap from each other.

The pixel electrode 39 has a base end portion 39a which has a reverse L shape in plan view, three strip electrodes 39c and three strip electrodes 39d which extend from the base end portion 39a, and a contact portion 39b. The strip electrodes substantially have linear shapes and extend in parallel with one another in the X-axis direction. Of the plurality of strip electrodes, three strip electrodes 39c are arranged in the transmissive display region T, and two strip electrodes 39d are arranged in the reflective display region R. The strip electrode 39d which is provided at the central portion of the subpixel region in the drawing is arranged to overlap the boundary of the reflective display region R and the transmissive display region T (a side of the reflecting layer 29 facing the transmissive display region T) in plan view.

The common electrode 49 is a flat, substantially uniform conductive film formed of a transparent conductive material such as ITO and so on, and is formed over the entire surface of the image display region of the liquid crystal device 300. If a voltage is applied between the pixel electrode 39 and the common electrode 49 having the above-described configuration, an electric field along the surface of the substrate substantially parallel to the Y-axis direction is primarily generated between the strip electrodes 39c and 39d of the pixel electrode 39 and the common electrode 49.

The TFT 30 is provided in the vicinity of the intersection between the data line 6a and the scanning line 3a. The TFT 30 has a semiconductor layer 35 which is formed of amorphous silicon and is partially formed in the planar region of the scanning line 3a, and a source electrode 6b and a drain electrode 132 which are formed to partially overlap the semiconductor layer 35. The scanning line 3a functions as a gate electrode of the TFT 30 at a position which overlaps the semiconductor layer 35 in plan view.

The source electrode 6b of the TFT 30 is formed to extend from the data line 6a to the semiconductor layer 35 and has an L shape in plan view, and the drain electrode 132 extends toward the −Y side and is electrically connected to a capacitor electrode 131 having an L shape in plan view. On the capacitor electrode 31, the contact portion 39b of the pixel electrode 39 is arranged to extend from the central portion of the subpixel region. The capacitor electrode 131 and the pixel electrode 39 are electrically connected through a pixel contact hole 45 provide at a position where both overlap in plan view. Further, the capacitor electrode 131 is arranged in the planar region of the capacitor line 3b, and a storage capacitor 70 is formed at that position with the capacitor electrode 131 and the capacitor line 3b facing each other in a thicknesswise direction as electrodes.

Figure 10:
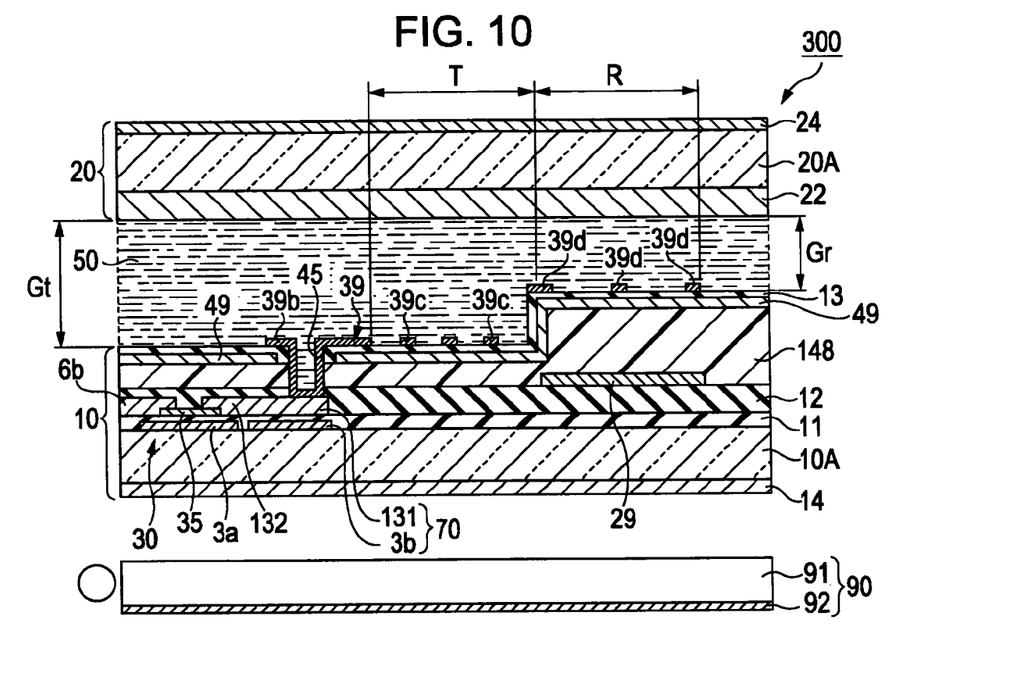
FIG. 10 is a structural cross-sectional view taken along the line X-X of FIG. 9.

Referring to the sectional structure shown in FIG. 10, the TFT array substrate 10 and the counter substrate 20 are arranged so as to face each other with a liquid crystal layer 50 interposed therebetween. The TFT array substrate 10 has a substrate main body 10A as a base. On the inner surface of the substrate main body 10A (facing the liquid crystal layer 50), the scanning line 3a and the capacitor line 3b are formed, and a gate insulating film 11 is formed to cover the scanning line 3a and the capacitor line 3b. On the gate insulating film 11, the semiconductor layer 35 formed of amorphous silicon is formed, and the source electrode 6b and the drain electrode 132 are provided to partially run onto the semiconductor layer 35. On the rift side of the drain electrode 132 in the drawing, the capacitor electrode 131 is integrally formed.

The semiconductor layer 35 is arranged so as to face the scanning line 3a through the gate insulating film 11, and the scanning line 3a in the opposing region constitutes the gate electrode of the TFT 30. The capacitor electrode 131 is arranged so as to face the capacitor line 3b through the gate insulating film 11, and the storage capacitor 70 is formed in a region where the capacitor electrode 131 overlaps the capacitor line 3b, with the gate insulating film 11 as a dielectric film.

A first interlayer insulating film 12 is formed to cover the semiconductor layer 35, the source electrode 6b, the drain electrode 132, and the capacitor electrode 131. On the first interlayer insulating film 12, the reflecting layer 29 formed of a light-reflective metal film such as aluminum or silver is partially formed in the subpixel region. A liquid-crystal-layer-thickness-adjusting layer 148 is formed to cover the reflecting layer 29 and the first interlayer insulating film 12. The liquid-crystal-layer-thickness-adjusting layer 148 has a step shape formed to partially have different film thicknesses in the subpixel region. That is, the liquid-crystal-layer-thickness-adjusting layer 148 is formed to have a large film thickness in the formation region of the reflecting layer 29 and to have a relatively small film thickness in a region outside the reflecting layer 29.

The common electrode 49 formed of a transparent conductive material such as ITO and so on is formed to cover the liquid-crystal-layer-thickness-adjusting layer 148, and a second interlayer insulating film 13 formed of silicon oxide and so on is formed to cover the common electrode 49. On the second interlayer insulating film 13, the pixel electrode 39 formed of a transparent conductive material such as ITO and so on is patterned. The pixel contact hole 45 is formed to pass through the first interlayer insulating film 12, the liquid-crystal-layer-thickness-adjusting layer 148, and the second interlayer insulating film 13 and reach the capacitor electrode 131. A part of the contact portion 39b of the pixel electrode 39 is buried in the pixel contact hole 45, and the pixel electrode 39 and the capacitor electrode 131 are electrically connected. An opening is also provided in the common electrode 49 to correspond to the formation region of the pixel contact hole 45 such that the common electrode 49 does not come into contact with the pixel electrode 39. Further, though not shown, an alignment film formed of polyimide and so on is formed to cover the pixel electrode 39 and the second interlayer insulating film 13.

On the liquid-crystal-layer-thickness-adjusting layer 148, the common electrode 49, the second interlayer insulating film 13, the pixel electrode 39, and so on are laminated, but these layers are formed on the substrate main body 10A to have shapes according to the surface shape of the liquid-crystal-layer-thickness-adjusting layer 148. Accordingly, the step shape according to the surface shape of the liquid-crystal-layer-thickness-adjusting layer 148 is formed on the surface of the TFT array substrate 10. With this configuration, in the liquid crystal device 300 of this embodiment, the multi-gap structure in which the liquid-crystal-layer thickness Gr in the reflective display region R and the liquid-crystal-layer thickness Gt in the transmissive display region T are made different is also formed in the subpixel region. In this embodiment, the liquid-crystal-layer thickness Gr is adjusted to be about half of the liquid-crystal-layer thickness Gt, and the phase difference of the liquid crystal layer 50 in the reflective display region R is adjusted to be about half of the phase difference of the liquid crystal layer 50 in the transmissive display region T.

As shown in FIG. 9, in the liquid crystal device 300 of this embodiment, the strip electrodes 39c are arranged densely in the reflective display region R, and the strip electrodes 39d are arranged sparsely in the transmissive display region T. Then, the inter-electrode gap dr in the reflective display region R is made wider than the inter-electrode gap dt in the transmissive display region T. Further, the inter-electrode gap dr is set about twice as large as the inter-electrode gap dt according to the relationship between the liquid-crystal-layer thicknesses Gr and Gt.

The optical axis arrangement of the liquid crystal device 300 according to this embodiment is the same as that of the first embodiment shown in FIG. 2B. The transmission axes of the polarizing plates 14 and 24 are arranged in parallel with the X-axis and Y-axis directions, respectively. Further, the rubbing direction of the alignment film has an angle of about 30° with respect to the direction of the transverse electric field generated between the strip electrodes 39c and 39d and the common electrode 49. This is the same as that of the first embodiment shown in FIG. 2B.

The operation of the liquid crystal device 300 having the above-described configuration is the same as that of the first embodiment described above, and thus the same advantages can be obtained. That is, the liquid-crystal-layer-thickness-adjusting layer 148 is provided to form the multi-gap structure. Therefore, a different in optical path of display light for reflective display and transmissive display can be eliminated, and a difference in phase difference to be applied to display light does not occur. Further, the change in threshold voltage due to the use of the multi-gap structure is suppressed by making the inter-electrode gap dr in the reflective display region R about twice as large as the inter-electrode dt in the transmissive display region T. As a result, reflective display and transmissive display having uniform electro-optical characteristics can be obtained.

According to the liquid crystal device 300 of this embodiment, favorable display for both reflective display and transmissive display can be obtained. Further, these effects can be easily implemented only by changing the planar shapes of the pixel electrode 39 and the common electrode 49.

In this embodiment, the number of strip electrodes 39c formed in the reflective display region R is different from the number of strip electrodes 39d formed in the transmissive display region T, and thus the inter-electrode gaps dr and dt are made different from each other. However, like the second embodiment described above, the inter-electrode gaps dr and dt can be adjusted by the line widths of the strip electrodes. In this case, the same advantages can also be obtained. Further, although the reflecting layer 29 is provided between the liquid-crystal-layer-thickness-adjusting layer 148 and the substrate main body 10A in this embodiment, the reflecting layer 29 may be formed between the liquid-crystal-layer-thickness-adjusting layer 148 and the common electrode 49.

The liquid crystal device 300 of this embodiment is the FFS-mode liquid crystal device, and liquid crystal is driven by the electric field generated between the edge of the pixel electrode 39 and the common electrode 49. Accordingly, even when the reflecting layer 29 is provided on the TFT array substrate 10, the transverse electric field to be applied to the liquid crystal layer 50 is not influenced. Therefore, since the TFT array substrate 10 is arranged close to the backlight 90 (on the rear surface as viewed from an observer), external light can be prevented from being incident on metal wiring lines such as the scanning line 3a or the data line 6a, the capacitor line 3b, and so on formed on the TFT array substrate 10. As a result, display visibility can be prevented from being degraded due to diffused reflection of external light by the metal wiring lines.

In this embodiment, the common electrode is formed by patterning for every one subpixel region. However, even when the common electrode is formed over a plurality of subpixel regions or a display region (including all subpixel regions), display can be performed.

Electronic Apparatus

Figure 11:
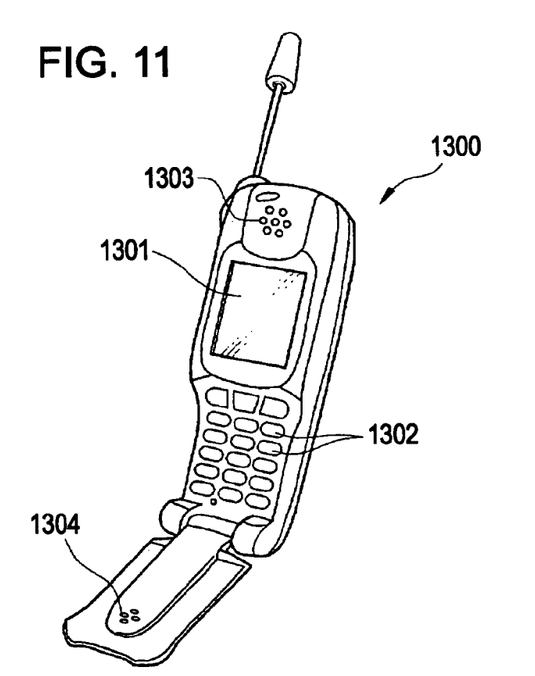
FIG. 11 is a structural perspective view showing an example of an electronic apparatus.

FIG. 11 is a structural perspective view of a cellular phone which is an example of an electronic apparatus having the liquid crystal device according to each embodiment of the invention as a display unit. The cellular phone 1300 has the liquid crystal device according to each embodiment of the invention as a small display unit 1301, a plurality of operating buttons 1302, a receiver 1303, and a transmitter 1304.

The liquid crystal device of each embodiment can be properly used as an image display unit of an electronic book, a personal computer, a digital still camera, a liquid crystal television, a viewfinder-type or monitor-direct-view-type video tape recorder, a car navigation device, a pager, an electronic organizer, an electronic calculator, a word processor, a work station, a video phone, a POS terminal, and an apparatus having a touch panel, in addition to the cellular phone. In any electronic apparatus, transmissive display and reflective display can be performed with high luminance, high contrast, and wide viewing angle.

The entire disclosure of Japanese Patent Application Nos: 2005-151890, filed May 25, 2005 and 2006-076306, filed Mar. 20, 2006 are expressly incorporated by reference herein.

What is claimed is:

1. A liquid crystal device comprising:
    first and second substrates which are arranged so' as to face each other with a liquid crystal layer interposed therebetween; and
    first and second electrodes which are provided on the first substrate facing the liquid crystal layer, each of the first and second electrodes having one or more strip electrodes, the liquid crystal layer being driven by electric fields generated between the first and second electrodes,
    a reflective display region for reflective display and a transmissive display region for transmissive display being provided in each of a plurality of subpixel regions,
    a liquid-crystal-layer-thickness-adjusting layer being provided in at least the reflective display region so as to vary the thickness of the liquid crystal layer in the subpixel region,
    a gap between the first and second electrodes in a main direction of an electric field in the transmissive display region being narrower than a gap between the first and second electrodes in a main direction of an electric field in the reflective display region,
    the one or more strip electrodes of the first electrode and the one or more strip electrodes of the second electrode being alternately arranged substantially in parallel with each other in each of the transmissive display region and the reflective display region, and
    a product dt×Gt of the gap dt between the first electrode and the second electrode in the electric field direction in the transmissive display region and the thickness Gt of the liquid crystal layer in the transmissive display region being substantially equal to a product dr×Gr of the gap dr between the first electrode and the second electrode in the reflective display region and the thickness Gr of the liquid crystal layer in the reflective display region, wherein the thickness of the liquid crystal layer of the reflective display region is smaller than, the thickness of the liquid crystal layer of the transmissive display region.

2. The liquid crystal device according to claim 1, of the strip electrodes, the one or more strip electrodes arranged in the transmissive display region having a width larger than that of the one or more strip electrodes arranged in the reflective display region.

3. An electronic apparatus comprising the liquid crystal device according to claim 1.

* * * * *